Jan. 6, 1970  G. DE HEER ET AL  3,487,854

ADJUSTABLE PNEUMATIC TIMER

Filed March 5, 1968  2 Sheets-Sheet 1

INVENTORS:
Garrie DeHeer,
James Greenwood,
BY Harry B[illegible], ATTORNEY

ADJUSTABLE PNEUMATIC TIMER

Filed March 5, 1968

INVENTORS:
Garrie De Heer
James Greenwood,
BY Harry B. Rook, ATTORNEY

United States Patent Office 3,487,854

Patented Jan. 6, 1970

3,487,854

ADJUSTABLE PNEUMATIC TIMER

Garrie DeHeer, Hawthorne, and James Greenwood, Cliffwood Beach, N.J., assignors to Acme Tool & Machine Company, Kearney, N.J., a corporation of New Jersey Filed Mar. 5, 1968, Ser. No. 710,493
Int. Cl. F16k *11/10, 51/00;* F17d *3/00*
U.S. Cl. 137—624.15 7 Claims

ABSTRACT OF THE DISCLOSURE

Each of a plurality of rotary valve units in a timer for operations of a plurality of pneumatically operated units, includes a valve ring having a slot and being carried by a gear independently rotatably adjustable in a housing throughout a full 360° of rotation without stopping the timer, and means associated with said gear establishing communication between said slot at any degree of rotation with an outlet passage. An air inlet pipe continuously rotates in the housing and has port bushings slidable therein each held by air pressure in sliding port-sealing contact with the inner peripheral surface of one valve ring to register with said slot once during each revolution of the pipe.

BACKGROUND OF THE INVENTION

Field of the invention

The invention relates in general to a timer having a plurality of valve units for controlling operations of a plurality of pneumatically operated devices, and particularly to a valve unit which is adjustable throughout 360° of rotation independent of the other valve units and while the timer is operating.

The prior art

Representative of this field are Larison Patent 2,823,698, Feb. 18, 1958 and Zappia Patent 3,098,505, July 23, 1963 among others.

However, the valve units are complicated, involve a large number of expensive parts, and leave much to be desired from the standpoints of fluid-tightness, reliable coaction of the parts and durability. In 2,823,698, reciprocating, spring-closed cam-opened valves are utilized, while in 3,098,505, valve sleeves having radial parts rotate coaxially relatively to and around a continuously rotating valve plug which has longitudinal passages communicating with exterior circumferential grooves with which communicates said ports in the sleeves.

SUMMARY

A primary object of the present invention is to provide a timer for pneumatically operated devices which comprises a novel and improved construction and combination of valve units each of which is adjustable independently of the other units and includes a small number of simple, relatively inexpensive parts which coact reliably and are durable.

The timer includes a housing in which is a continuously rotatable air inlet pipe in which are a plurality of lateral port bushings each slidably pressed and held by air pressure in fluid tight contact with the inner peripheral surface of a valve ring which is selectively rotatable coaxially with said pipe and has a slot to register with said bushing once during each revolution of said pipe.

The housing includes means coactive with said slot in the valve ring to provide an air outlet to be connected to a pneumatically operated device the operation of which is controlled by the timer.

BRIEF DESCRIPTION OF THE PREFERRED EMBODIMENT

Figure 1:
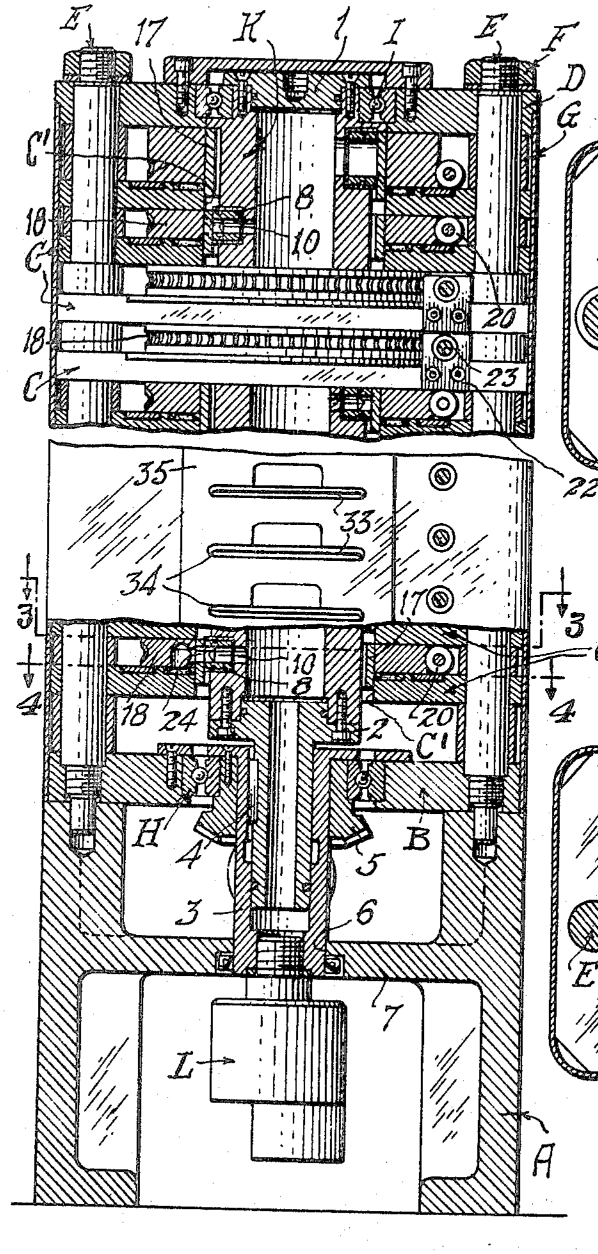
FIG. 1 is a central vertical sectional view through the time approximately on the plane of the line 1—1 of FIG. 3, with portions shown in front elevation.
Figure 3:
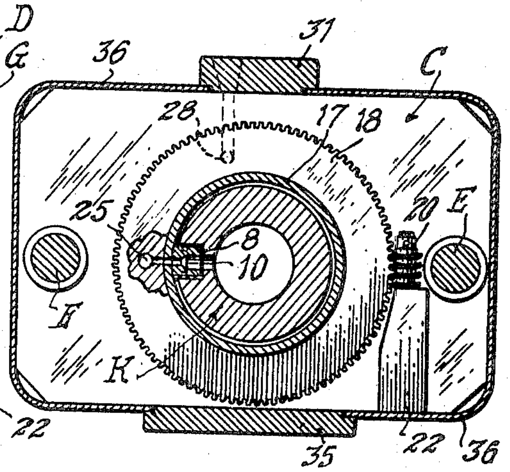
FIG. 3 is a horizontal sectional view approximately on the plane of the line 3—3 of FIG. 1.

Specifically describing the invention, the timer has been shown as including a housing which comprises a base section A upon which are disposed in vertically spaced stacked relation a bottom bearing plate B, a plurality of partition plates C and a top bearing plate D, each of said plates having a central opening C′ and holes through which extend support rods E the lower ends of which are supported by the base section A and the upper ends of which have clamping nuts F for clamping the plates together with spacer sleeves G between the plates.

Journaled in bearings H and I in the respective lower and upper bearing plates B and D is an air inlet pipe K which extends through the openings C′ and the upper end of which is closed by a packed plug 1 and the lower end of which includes a tubular coupling element 2 which is telescopically fitted in a second coupling element 3 to rotate therewith. As shown, there is a keyed connection 4 between the coupling element 3 and the coupling element 2 and the coupling element 3 has a beveled gear 5 fixedly connected thereto and fitted in the bearing H. The lower end of the coupling element 3 extends through an opening 6 in a horizontal portion 7 of the base section and has connected thereto a rotatable hose coupling L to which an air supply hose may be connected.

Meshing with the gear 5 for continuously rotating the pipe K is a beveled pinion M rigidly connected to a countershaft N which is journaled in a bearing O of generally known construction carried by the base section A. In use, the shaft N is drivingly connected to a source of power, for example through speed reduction gearing to an electric motor.

Figure 6:
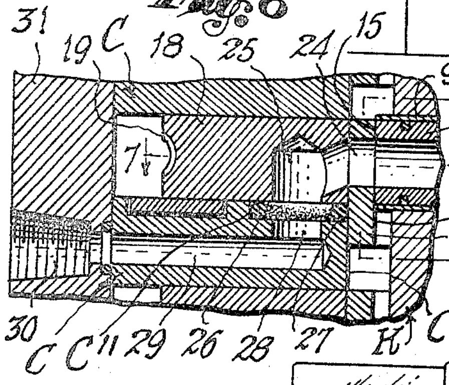
FIG. 6 is an enlargement of the portion of FIG. 2 enclosed within broken lines.
Figure 7:
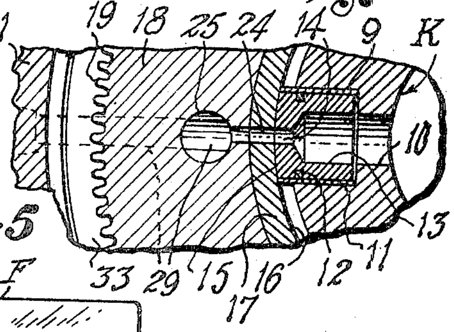
FIG. 7 is a fragmentary horizontal sectional view approximately on the plane of the line 7—7 of FIG. 6.

As hereinbefore indicated, there are shown a plurality of valve units each of which is intended to control the operation of a pneumatically operated device, for example, one of a plurality of fluid motors utilized for controlling or actuating the individual element of a complicated machine. All of the valve units may be of substantially the same construction. Each valve unit includes a port bushing 8 which is preferably cylindrical and has a sliding fit in the counterbored portion 9 of a port 10 extending laterally through the wall of the air inlet pipe K. Preferably a liner sleeve 11 is interposed between the port bushing and the wall of the counterbored portion 9 as best shown in FIGS. 6 and 7 and the bushing has secured therein an O-ring 12 providing a fluid-tight joint between the bushing and the walls of the port. The inner end portion of the bushing has a preferably cylindrical coaxial recess 13 which communicates with a relatively narrow slot 14 in the other end of the bushing.

Figure 2:
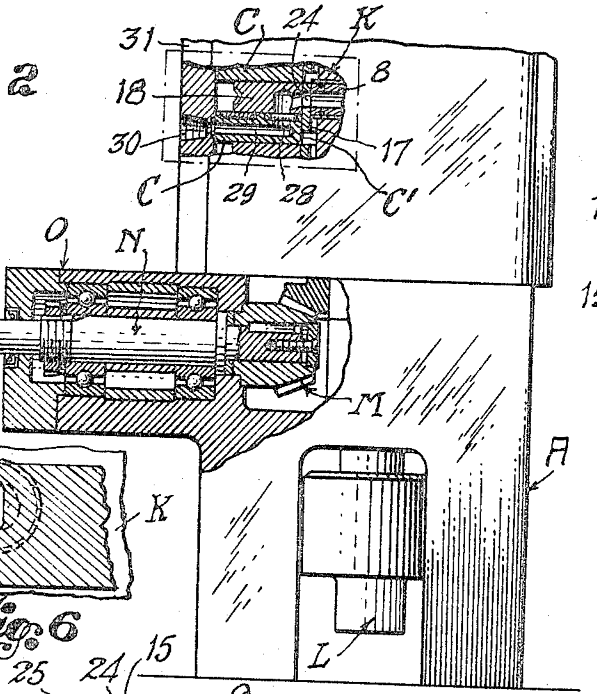
FIG. 2 is a fragmentary side elevational view of the lower portion of the timer with portions broken away and shown in vertical section.
Figure 8:
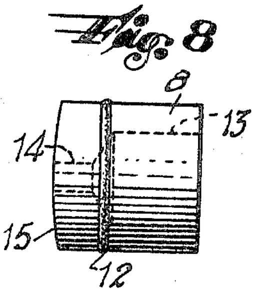
FIG. 8 is an enlarged detached side elevation of one of the port bushings.
Figure 10:
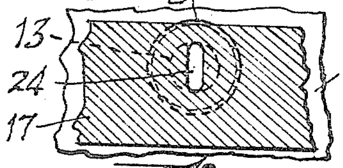
FIG. 10 is a fragmentary sectional view approximately on the plane of the line 10—10 of FIG. 6.
Figure 9:
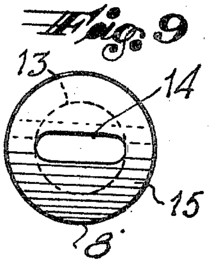
FIG. 9 is an elevation of the slotted end thereof.
Figure 5:
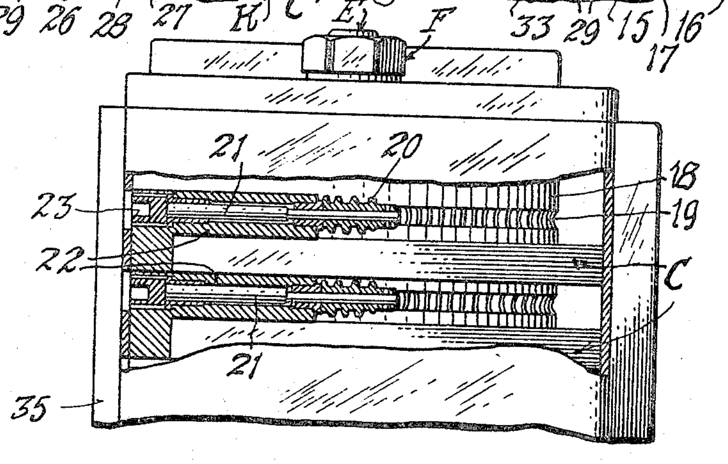
FIG. 5 is a fragmentary side elevational view of the upper portion of the timer on an enlarged scale with portions broken away and shown in section.

The surface of the last mentioned end of the bushing is cylindrically convex as indicated at 15 with the radius of curvature equal to the radius of the inner peripheral surface 16 of a hardened steel valve ring 17 which is shown as journaled in the opening C′ of a plate C and rigidly connected to and carried by a gear 18 the outer periphery of which is formed with gear teeth 19 meshing with a worm 20 which is carried by an actuating shaft 21 rotatably mounted in a bearing bracket 22 secured to one of the partition plates C (FIG. 5). The outer end of the shaft is formed for connection to a mechanical device for rotating the shaft and the worm; and as shown the end of the shaft has an enlarged portion formed with a socket 23 to be engaged by a suitable wrench. The valve ring has an opening preferably in the form of a slot 24 having its longer axis in a diametral plane to register with the slot 14 in the port bushing once during each revolution of the air inlet pipe, as best shown in FIGS. 2, 6 and 7, and the valve ring is rotatably adjusted to permit the slot to be located at any selected angular position with respect to the axis of rotation.

Figure 4:
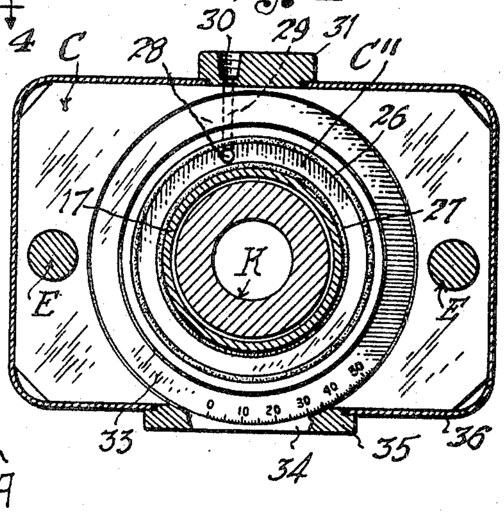
FIG. 4 is a similar view approximately on the plane of the line 4—4 of FIG. 1.

Leading from the valve slot 24 is a passage 25 in the gear 18 which opens through the lower side surface of the gear and between said surface of the gear and walls of a groove C″ in the adjacent valve casing plate C are horizontally spaced coaxial O-rings 26 and 27 which form a channel between them, the gear and the plate C as best shown in FIG. 4. This channel serves as a part of the outlet for the valve unit and, as shown in FIG. 4, at a desirable point the plate has a duct 28 which communicates with a radial passage 29 in the plate, which is adapted to be connected to the pneumatically operated device under control by the particular valve unit. As shown, the passage 29 leads to a threaded socket 30 in a vertical plate 31 which is secured to the edges of the plates C. Any suitable hose or pipe connection can be utilized in association with the socket 30 for connecting the outlet to the pneumatic device under control.

With this construction it will be seen that when the slot 14 of the port bushing is in register with the valve slot 24 of the valve ring, the air from the pipe K will flow through the port bushing, thence through the passage 25 in the gear into the channel between the packing rings 26, 27 and thence through the duct 28, passage and outlet passage 29 to the pneumatic device under control. The time of operation of said pneumatic device is adjustable by rotation of the gear through manual manipulation of the worm 20 through, for example, insertion of a wrench into the socket 23 of the worm shaft 21, and this adjustment can be effected throughout 360° of rotation and without stopping the timer. Each valve unit can be adjusted independently of the other valve units so that the operations of the several pneumatic devices can be controlled as desired.

It will be seen that an important feature of the invention is the port bushing slidably mounted in the bore of the air inlet shaft and constantly pressed under air pressure to cause continuous fluid-tight contact of the surface 15 of the bushing with the interior surface 16 of the valve ring. The cylindrical surface 15 of the bushing will prevent rotation of the bushing and ensure accurate register of the bushing slot 14 with the ring slot 24. While slots 14 and 24 are desirable to provide a quick puff of air for operating the pneumatic device, under some circumstances it may be desirable to substitute an opening of some other shape for either or both slots 14 and 24.

For the purpose of visually indicating the degree of rotation of the gear 18, each gear may have attached thereto a dial ring 33 the edge of which extends through a slot 34 in a face plate 35 of the housing.

While the stacked plates clamped on the rods E form a housing, it is desirable that they be enclosed by a cover 36, two sections of which are shown connected between the top and bottom bearing plates and the plates 31 and 35. As a feature of the invention it will be observed that the various plates can be easily and quickly assembled and disassembled and the driving gears can be easily and quickly separated from the air inlet pipe and from the base section A of the housing. This not only facilitates inspection and repair of the parts but also enables easy and quick replacement of the parts such as the port bushings and the valve rings.

While the now preferred embodiment of the invention has been illustrated and described, it will be understood that modifications and changes in the construction of the timer may be made within the spirit of the invention and the scope of the appended claims.

We claim:

1. A timer including a valve unit having two spaced plates each formed with an opening in alignment with the opening in the other plate, a rotatable air inlet pipe extending through said openings and having a lateral port, a valve ring having a valve slot, mounting means carrying said ring rotatably mounted between said plates with the inner surface of the ring coaxial with said pipe, a port bushing slidably mounted in said lateral port of the inlet pipe and actuated by air pressure in said pipe to hold the outer end of the bushing in fluid-tight contact with the inner peripheral surface of said valve ring to register with a valve slot once during each revolution of the air inlet pipe, means for rotating said mounting means selectively different degrees and means including passages in said mounting means and in one of said plates establishing communication between said valve slot and an air outlet.

2. A timer as defined in claim 1 wherein there are a plurality of said valve units in vertically stacked relation and separably but rigidly connected together by support rods with spacers on the support rods between each two adjacent plates.

3. A timer as defined in claim 1 wherein there are a plurality of said valve units in vertically stacked relation and separably but rigidly connected together by support rods with spacers on the support rods between each two adjacent plates and with the addition of a base section on which said rods are separably mounted, and drive gearing including a plurality of elements one of which is connected to said air inlet pipe and another of which is adapted to be connected to a source of power.

4. A timer as defined in claim 1 wherein said mounting means includes a gear having each of opposite ends in contact with one of said plates, and said valve ring is connected to inner periphery of said gear with a portion journaled in said opening of one of said plates.

5. A timer as defined in claim 1 wherein said mounting means includes a gear having each of opposite ends in contact with one of said plates, and wherein the last-named means includes a passage that leads from said valve slot through one end surface of said gear and communicates with an annular channel in the upper surface of said one plate with which channel communicates said passage in said one plate.

6. A timer as defined in claim 1 wherein said port bushing is cylindrical and the surface of said outer end thereof is cylindrically convex with a radius equal to the radius of said inner peripheral surface of the valve ring.

7. A timer as defined in claim 1 wherein said valve slot has its longer axis in a diametral plane of the ring, said port bushing is cylindrical and the surface of said outer end thereof is cylindrically convex with a radius equal to the radius of said inner peripheral surface of the valve ring and the outer end of the opening through the bushing is a slot whose longer axis lies in a diametral plane of the valve ring.

References Cited

UNITED STATES PATENTS

| | | | |
|---|---|---|---|
| 2,972,357 | 2/1961 | Ford | 137—625.11 |
| 3,073,289 | 1/1963 | Candelise | 137—625.11 X |
| 3,098,505 | 7/1963 | Zappia | 137—624.2 X |

ALAN COHAN, Primary Examiner

U.S. Cl. X.R.

137—624.2, 625.11; 251—172